Nov. 5, 1957 — C. PAULSON — 2,811,813
APPARATUS FOR SHAPING GLASS TUBES
Filed May 27, 1954 — 3 Sheets-Sheet 1
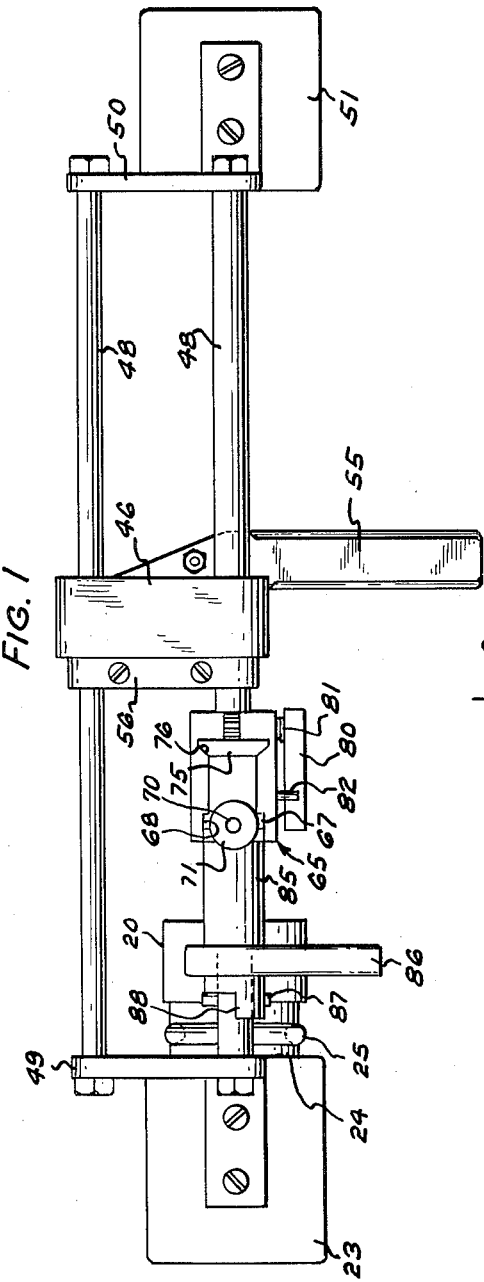
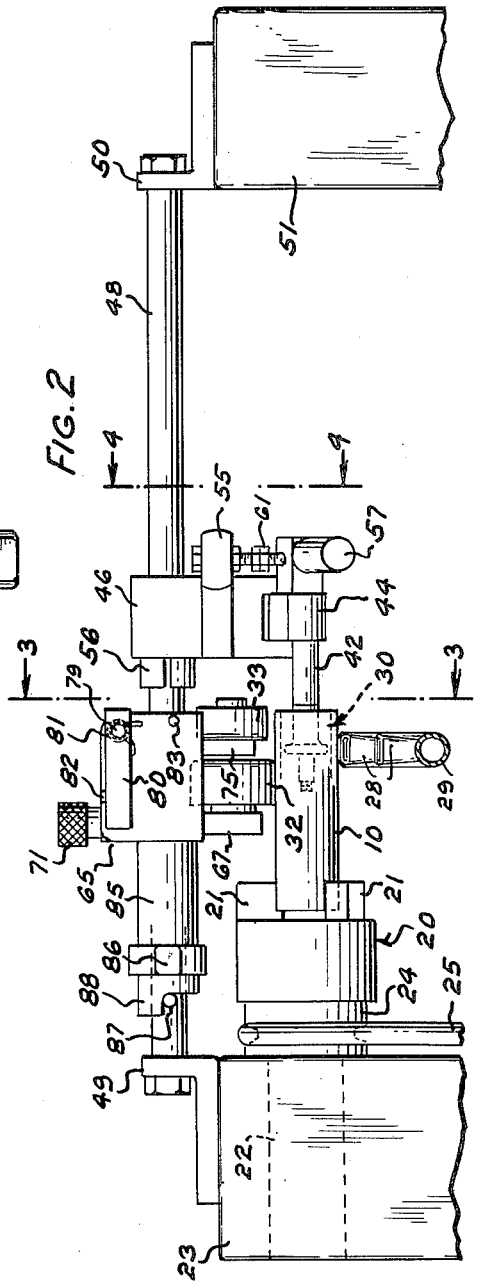
INVENTOR
C. PAULSON
BY C. B. Hamilton
ATTORNEY Nov. 5, 1957  C. PAULSON  2,811,813
APPARATUS FOR SHAPING GLASS TUBES
Filed May 27, 1954  3 Sheets-Sheet 2
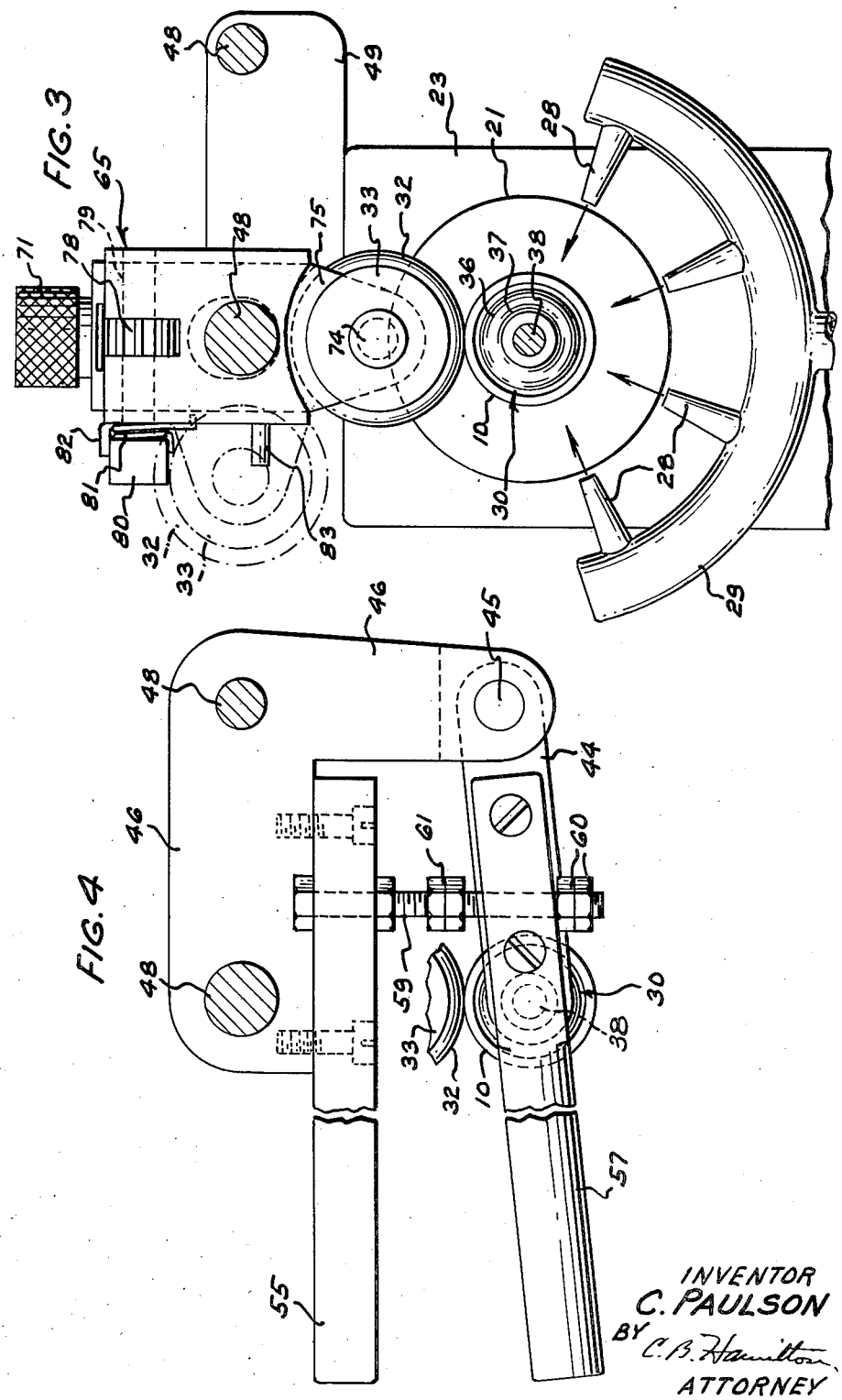
INVENTOR
C. PAULSON
BY C.B. Hamilton
ATTORNEY

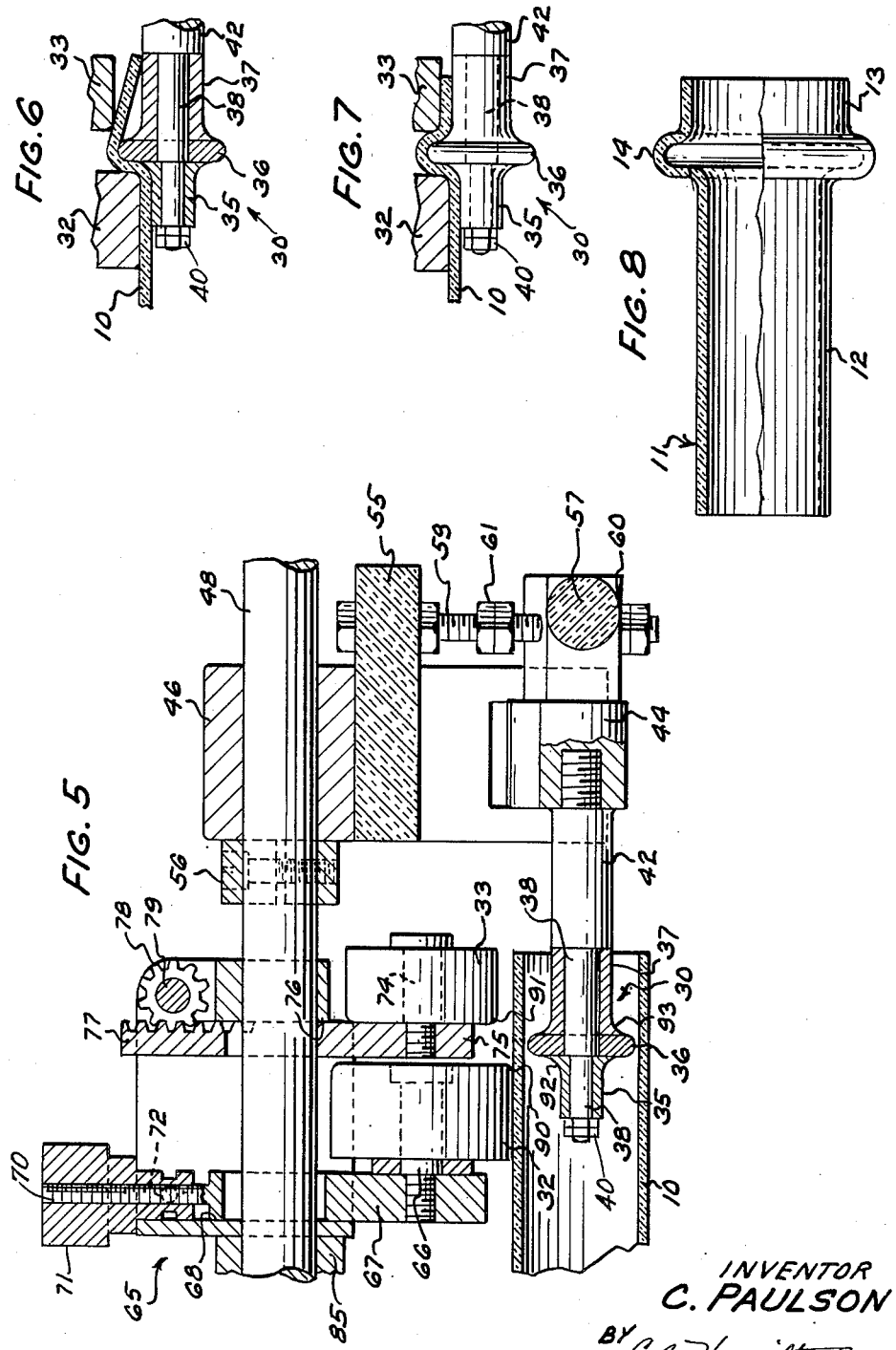

2,811,813
Patented Nov. 5, 1957

2,811,813
APPARATUS FOR SHAPING GLASS TUBES

Christian Paulson, St. Paul, Minn., assignor to Western Electric Company, Incorporated, New York, N. Y., a corporation of New York Application May 27, 1954, Serial No. 432,744

7 Claims. (Cl. 49—7)

This invention relates to an apparatus for shaping glass tubes and more particularly to an apparatus for forming a glass tube into an envelope having a predetermined configuration with portions thereof different diameters.

An object of the invention is to provide an improved apparatus for forming a glass envelope having portions thereof of different diameters with uniform wall thickness.

An apparatus illustrating certain features of the invention may include a chuck for supporting a glass tube for rotation about its axis, means for rotating the chuck and the tube, and means for heating the portion of the tube which is to be shaped. A composite arbor having a plurality of annular forming rollers freely mounted for rotation relative to each other about a common axis and having outer peripheries of predetermined configuration engageable with the inner periphery of the glass tube is supported for movement axially into the tube and is movable transversely of the axis into engagement with the glass tube to deform portions thereof, and a plurality of hollow forming rollers engageable with the outer periphery of the glass tube are mounted for movement individually into predetermined operative positions in engagement with the glass tube for cooperation with the annular sections of said composite arbor to form the glass tube into a predetermined shape while maintaining substantially uniform wall thicknesses therein.

Other objects and advantages of the invention will become apparent by reference to the following detailed description and the accompanying drawings illustrating a preferred embodiment thereof, in which Fig. 1 is a plan view of the apparatus;

Fig. 2 is a side view thereof;

Figs. 3 and 4 are vertical cross-sectional views through the apparatus taken along the lines 3—3 and 4—4 of Fig. 2;

Fig. 5 is a longitudinal vertical sectional view through a portion of the apparatus showing the composite mandrel and the backing rollers in one position during the formation of the envelope;

Figs. 6 and 7 are fragmentary views of a portion of the apparatus with the parts thereof in different positions during the forming of the envelope; and Fig. 8 is a longitudinal sectional view of the envelope formed with the present apparatus.

The present apparatus is designed to form a straight tube of glass 10 (Figs. 2 and 5) into an envelope 11 having a predetermined shape including a cylindrical end portion 12 of one diameter, a cylindrical end portion 13 of another diameter, and an annular curved portion 14 of a different diameter.

The apparatus comprises a chuck 20 (Fig. 2) having a plurality of adjustable jaws 21 for gripping the end of the glass tube 10 to support it for rotation about its axis. The chuck 20 is secured to the end of a spindle 22 which is mounted for rotation in an end frame 23 of the apparatus. A pulley 24 on the spindle 22 has a belt 25 thereon which is driven by a motor (not shown) for imparting rotation to the chuck 20 and the glass tube 10.

During the forming of the glass tube 10 it is heated by gas from a plurality of jets 28 on a gas manifold 29 mounted on the frame of the apparatus in a position to heat the righthand end portion of the glass tube 10 as viewed in Fig. 1.

The glass tube 10 is adapted to be formed into the envelope 11 by a composite arbor 30 which is adapted to be moved axially into one end of the tube and moved transversely of the axis into engagement with the inner surface of the heated portion of the tube to deform the walls thereof into a predetermined shape in cooperation with a pair of backing or forming rollers 32 and 33 engageable with portions of the outer periphery of the tube.

The composite arbor 30 comprises a plurality of annular sections or rollers 35, 36, and 37 mounted on the shaft 38 for rotation about a common axis and having outer peripheries of predetermined contours conforming to the desired shape of the envelope 11. The annular sections 35, 36, and 37 are rotatable relative to each other and are retained on the shaft by a nut 40. The enlarged portion 42 of the shaft 38, is secured to an arm 44, which in turn has one end thereof pivotally mounted on a pin 45.

The pin 45 is supported in the bifurcated end of an L-shaped member or carriage 46 which is mounted for horizontal sliding movement on a pair of supporting rods or rails 48—48. The rods 48 at one end are supported in a bracket 49 mounted on the end frame 23 at the other end by a bracket 50 mounted on the other end frame 51 of the apparatus. A handle 55 of heat insulating material such as asbestos board secured to the carriage 46 may be engaged to manually move the carriage and the composite arbor horizontally to and from an operative position as shown in Fig. 2 in which position the carriage is stopped by a stop member 56 extending across and secured to the rods 48. The arm 44 has secured thereto a handle 57 of heat insulating material by means of which the arm 44 may be rocked about the pivot 45 to move the composite arbor 30 up and down during the forming of the envelope 11. A rod 59 fixed to the handle 55 extends through an aperture in the handle 57 and has stop nuts 60 secured thereon for supporting the arm 44 in a normal predetermined position with the composite arbor in coaxial alignment with a tube 10 supported in the chuck 20. Stop nuts 61 on the rod 59 limit the upward movement of the arm 44 and the composite arbor 30 to a predetermined position during the forming of the envelope 11.

The backing rollers 32 and 33 are mounted on a cradle 65 for movement relative to each other and are individually moved into engagement with the glass tube 10 during the forming of the enlarged portions 13 and 14 thereon. The roller 32 is rotatably supported on a pin 66 which is fixed to a slide bar 67 adjustably mounted for movement in a guideway 68 formed in the cradle 65. The slide bar 67 is slotted to provide clearance for the rod 48 and has a threaded stem 70 on the upper end thereof, which threaded stem engages the threaded bore of an adjusting nob 71 for adjusting the position of the roller 32 on the carriage. The nob 71 has a shank provided with an annular groove into which extend a pair of keys 72 or projections from opposite sides of the cradle 65 for holding the nob 71 against axial movement relative thereto.

The roller 33 is rotatably supported on a pin 74 which is fixed to a slide bar 75 mounted for sliding movement in a guideway 76 formed in the cradle 65 for guiding the roller relative thereto into and out of engagement with the glass tube 10. The slide bar 75 is slotted to provide clearance for the rod 48 therethrough and has gear teeth 77 milled therein to form a rack which meshes with a gear 78 fixed to a shaft 79. The shaft 79 is journalled in suitable bearings into the cradle 65 and has an end portion extending therefrom onto which is fixed a handle 80 by means of which the gear 78 and the rack 77 may be actuated to move the roller 33 from one position to another. A toroidal spring 81 stresses the handle for rotation in one direction to yieldably maintain the guide bar 75 and the roller 33 in its upper position against a stop 82 and the handle 81 is adapted to be stopped in a predetermined position in its opposite direction of movement by a stop pin 83 for moving the roller 33 into a predetermined position during the forming of the portions 13 and 14 of the glass tube 10.

The cradle 65 has a tubular bearing portion 85 engageable with the rod 48 for rotatably supporting the cradle and the rollers 32 and 33 for oscillating movement from a position above and adjacent the axis of the chuck 20 and the glass tube 10 (Fig. 3) through substantially 90° to a horizontal position indicated in dotted lines in Fig. 3 to permit the insertion and removal of glass tubes 10 relative to the chuck. By means of a handle 86 secured thereto the cradle 65 may be rotated from the horizontal inoperative position to the vertical operative position and a stop pin 87 on the rod 48 is adapted to engage the shoulders on a lug 88 formed on the end of the bearing portion 85 of the cradle to limit the extent of angular movement of the cradle.

The roller 32 is adjusted so that when the cradle 65 is in vertical position the periphery of the roller 32 will engage the periphery of the glass tube 10. The stop pin 83 is so positioned relative to the handle 80 to stop the roller 33 in a predetermined position with the periphery of the roller 33 spaced from the axis of the tube the desired distance for the formation of the portion 13 thereof. The rollers 32 and 33 are spaced apart to provide clearance between them for the formation of the curved portion 14 and the rollers have rounding corners 90 and 91 which roll portions of the glass around the annular section 30 of the arbor to form said curved portion 14 and which corners 90 and 91 cooperate with curved portions 92 and 93 of the annular sections 35 and 37 of the composite arbor to shape portions of the tube 10 to the desired configuration.

With the cradle disposed horizontally a glass tube 10 may be secured in the chuck 20 and rotated, and after the tube 10 has been heated to render portions of it plastic the handle 86 is manipulated to turn the cradle to a vertical position and cause the roller 32 to engage the outer periphery of a portion of the tube. The composite arbor 30 is then moved horizontally to locate it in a predetermined position within the tube as shown in Figs. 2 and 5, after which the handle 57 may be raised to move the arbor 30 upwardly into engagement with the upper portion of the rotating tube and cause the roller section 36 of largest diameter to press the glass outwardly and in cooperation with the roller section 35 to roll it around the corner 90 of the roller 32 as shown diagrammatically in Fig. 6. The roller section 36 having a larger diameter than that of the roller section 35 will rotate at a slower speed than the roller 35 during the forming operation. After the glass tube has been partially formed as shown in Fig. 6 the handle 80 is actuated to move the roller 33 into engagement with the glass tube 10 and press it around the roller section 36 and against the roller section 37 of the arbor into the final shape shown in Fig. 7. It will be noted that the roller sections 35, 36, and 37 having peripheral surfaces of different diameters will rotate at different speeds during the tube shaping operation and will in cooperation with the backing rollers 32 and 33 form the walls of the glass tube with a rolling action and with a minimum of pulling friction with the result that the wall thickness of the curved enlarged portions 13 and 12 of the envelope 11 is maintained substantially equal to that of the tube 10. After the envelope 11 has thus been formed the heat is removed, the arbor is withdrawn, the cradle 65 is rotated to its horizontal position, and after the glass has cooled the envelope 11 is removed from the chuck.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus for reshaping a glass sleeve, a holder for supporting said glass sleeve for rotation about its axis, a plurality of inner forming rollers of different diameters engageable with the inner surface of the glass sleeve, means for supporting the forming rollers for rotation relative to each other about a common axis, means for effecting relative movement between the holder and the rollers to engage the rollers with the inner surface of the sleeve to reshape the glass sleeve, a plurality of outer forming rollers mounted for movement into engagement with the outer surface of the glass sleeve for cooperation with the inner rollers to reshape the glass sleeve, and means for moving the outer rollers individually into engagement with the glass sleeve.

2. In an apparatus for forming a glass tube into an envelope having a plurality of different diameters, the combination of means for supporting a glass tube for rotation about its axis, a set of inner forming rollers having peripheral surfaces of predetermined contour and of different diameters engageable with the inner surface of said glass tube, a set of outer forming rollers having peripheral surfaces of predetermined contour and of different diameters engageable with the outer surface of said tube, means for mounting one of said sets of forming rollers for rotation relative to each other about a common axis and for movement transversely of said axis into engagement with said tube, means for moving the last-mentioned set of rollers into engagement with one surface of said glass tube, means for mounting the remaining set of forming rollers for rotation relative to each other and for movement individually into engagement with said tube for cooperation with said one set of rollers to reshape said tube to a predetermined configuration, and means for moving the rollers of said remaining set individually into engagement with the other surface of the glass tube.

3. In an apparatus for reshaping a glass sleeve, a holder for supporting said glass sleeve for rotation about its axis, a plurality of inner forming rollers of different diameters engageable with the inner surface of the glass sleeve, means for supporting the inner forming rollers for rotation relative to each other about a common axis, means for actuating said supporting means to move said inner forming rollers into engagement with the inner surface of the glass sleeve to reshape it, a plurality of outer forming rollers engageable with the outer surface of the glass sleeve for cooperating with the inner rollers to reshape the glass sleeve, means for mounting the outer forming rollers for movement toward the inner forming rollers, and manually operated means capable of moving said outer rollers individually into engagement with the glass sleeve.

4. In an apparatus for shaping a glass sleeve into a tubular envelope having a plurality of different diameters, the combination of a rotatable holder for supporting said glass sleeve for rotation about its axis, a composite arbor having a plurality of annular sections of predetermined shape and of different diameters mounted for rotation relative to each other about a common axis and engageable with the inner surface of said glass tube, a plurality of forming rollers engageable with the outer surface of the glass tube, means for supporting said forming rollers and said arbor for movement relative to each other to engage portions of the tube therebetween to reshape said sleeve into a predetermined configuration, means for moving the arbor to engage the annular sections thereof with the glass sleeve, and means for moving the forming rollers individually into engagement with the glass sleeve.

5. In an apparatus for shaping a glass sleeve into a tubular envelope having a plurality of different diameters, the combination of a rotatable holder for supporting said glass sleeve for rotation about its axis, means for rotating said holder, means for heating said sleeve, a composite arbor having a plurality of annular sections of predetermined shape and of different diameters mounted for rotation relative to each other and engageable with the inner surface of said glass tube, a plurality of forming rollers engageable with the outer surface of the glass tube, means for supporting said arbor for longitudinal and transverse movement relative to said holder and a sleeve held therein, means for moving said arbor, and means for moving said forming rollers individually into engagement with said sleeve.

6. An apparatus for shaping a glass tube into an envelope having a plurality of different diameters comprising a chuck for holding a glass tube for rotation about its axis, means for rotating said chuck, a composite arbor having a plurality of annular sections mounted for rotation relative to each other about a common axis and having outer surfaces of different diameters and predetermined configuration engageable with the inner periphery of said tube, a carriage mounted for longitudinal movement relative to the axis of the chuck and the glass tube, means on said carriage for supporting said composite arbor in a normal position in axial alignment with the chuck and a tube supported thereby for movement into the tube and for movement of the arbor transversely of the axis to shape said envelope, means for moving said arbor, a plurality of forming rollers engageable with the outer periphery of the glass tube, means for supporting said rollers for movement in a predetermined path into engagement with said tube, and means for moving said rollers for cooperation with said arbor to form said glass envelope.

7. An apparatus for forming a glass tube into an envelope having a plurality of different diameters comprising a chuck for holding a glass tube for rotation about its axis, means for rotating said chuck and the tube therein, a composite arbor having a plurality of roller sections mounted for rotation relative to each other about a common axis and having outer surfaces of different diameters and predetermined configuration engageable with the inner periphery of said tube, a carriage mounted for longitudinal movement relative to the axis of the chuck and the glass tube, means on said carriage for supporting said composite arbor in a normal position in axial alignment with the chuck and a tube supported thereby for movement into the tube and for moving the arbor transversely of the axis to shape said envelope, a plurality of forming rollers engageable with the outer periphery of the glass tube, a cradle, means for supporting said forming rollers on said cradle for rectilinear movement relative to each other into and out of engagement with said tube for cooperation with the roller sections of said arbor to form said glass envelope, and means for oscillating said cradle from an operative position with the rollers disposed adjacent and in alignment with said tube to an inoperative position remote from said tube to permit the loading and unloading thereof.

References Cited in the file of this patent

UNITED STATES PATENTS

| | | |
|---|---|---|
| 537,429 | Alexander | Apr. 16, 1895 |
| 1,528,392 | Baehr | Mar. 3, 1925 |
| 1,728,286 | Hoagland | Sept. 17, 1929 |
| 2,266,417 | Eisler | Dec. 16, 1941 |
| 2,284,089 | Hahn et al. | May 26, 1942 |
| 2,312,225 | Wilkinson | Feb. 23, 1943 |